May 29, 1962 J. W. RUSH 3,037,094
CIRCUIT EMPLOYING DOUBLE-DECK SWITCH AND BY-PASS CIRCUIT
Filed May 20, 1958
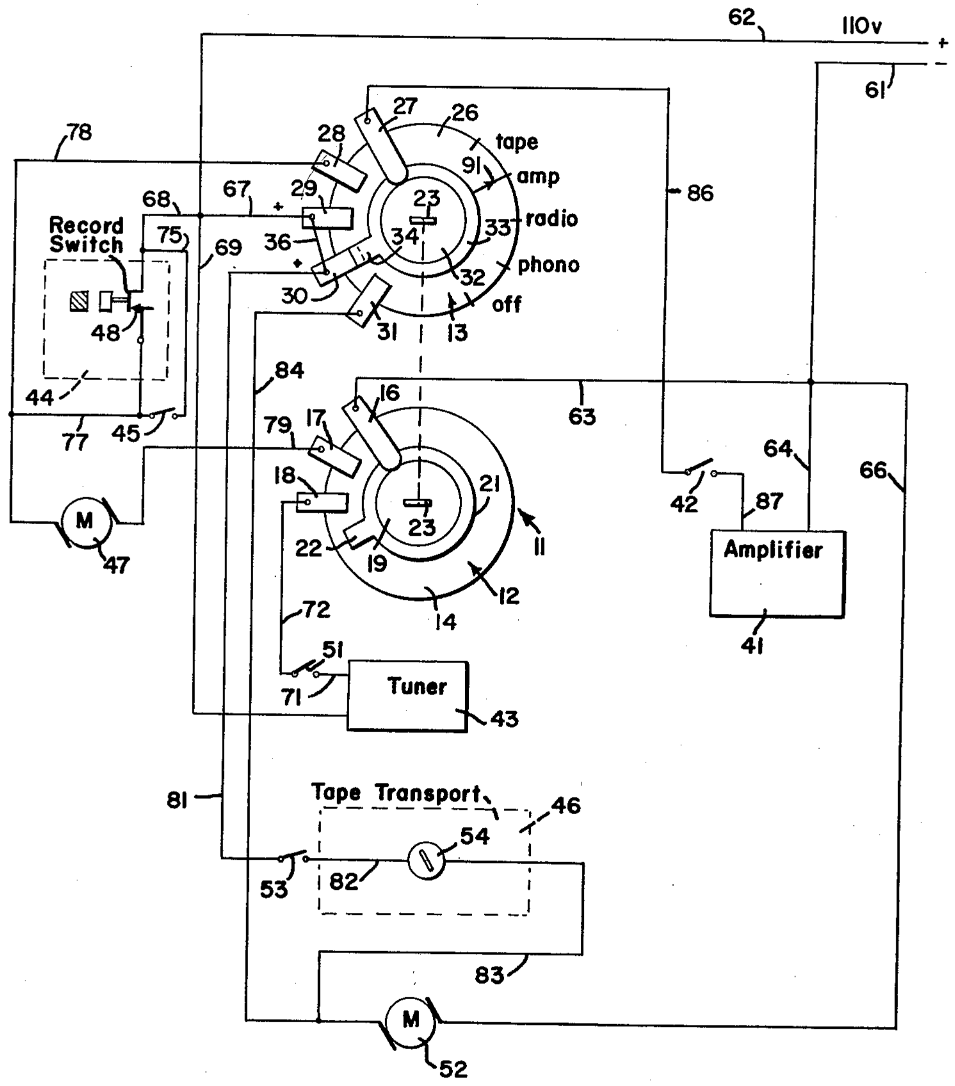
*INVENTOR.*
June Wesley Rush
*BY* Julian Caplan
attorney United States Patent Office 3,037,094
Patented May 29, 1962

3,037,094
CIRCUIT EMPLOYING DOUBLE-DECK SWITCH AND BY-PASS CIRCUIT

June Wesley Rush, 216 Nelson Ave. (Sharp Park), Pacifica, Calif.

Filed May 20, 1958, Ser. No. 736,481
1 Claim. (Cl. 179—100.11)

This invention relates to a new and improved circuit employing a double-deck switch and by-pass circuit. The invention has particular utility in such installations as radio-phonograph combination wherein these is also incorporated a tape transport or tape recorder.

More particularly, the invention employs a conventional type of double-deck electric switch, having a plurality of contacts, hereinafter described in detail, and arranged to selectively control a plurality of operating conditions. Thus, in the first position of the switch, all of the components are turned off. In second position a record player may be turned on and an amplifier energized, and the energization of record player and amplifier may be further controlled by the record player automatic switch and associated mechanism. In third position, the amplifier and radio tuner are energized, it being understood that the tuner is not energized in any other position. In the fourth position, the amplifier only is energized for use with various types of inputs, tape recorders and the like. In the fifth position, the tape transport or recorder may be turned on or off by a manual or automatic switch at any time, and the amplifier is energized.

Accordingly, it is a principal object of the present invention to provide a circuit and switch mechanism to permit selection of each of the foregoing five positions of adjustment at will.

It will be understood that instead of the specific mechanisms, such as radio tuner, record player, tape transport and the like, other mechanisms or components may be substituted or added.

The present invention provides a simple circuitry to permit manual selection of components to be energized as well as automatic switches to operate in the manner heretofore specified, and hereinafter described in detail, which circuitry has not, heretofore, been possible.

A further object of the present invention is to provide a circuit and switches so that manual switching may be performed whereby a switch is placed in a first position so that the amplifier is energized and the record player cannot be energized regardless of the setting of the automatic stop-switch for the record player. When the switch is in its second position, the record player cannot be energized except in such a way that its automatic stop-switch controls both the record player, motor and the energization of the amplifier. It will be understood that instead of the record player being controlled, as indicated in the paragraph, a tape transport, or other similar component having an automatic stop-switch, may be substituted. Thus, the control switch may be turned to the "automatic" position, whereby the amplifier as well as the motor for the record player, is turned off or on by the automatic record player switch. In the by-pass position of the switch the amplifier is energized but the record player cannot be energized.

In the accompanying drawing there is shown a schematic wiring diagram illustrating one embodiment of the present invention.

In the present invention, there is employed a double-deck rotary switch 11 of a type commercially available. The switch has a lower deck 12 and an upper deck 13. The lower deck 12 comprises an outer annular stationary ring 14 of dielectric material, around the periphery of which are fastened three electrical contacts 16, 17, 18. Rotatable in the center of the outer ring 14 is an inner ring 19 which carries on its periphery an annular conductor ring 21 which has projecting radially therefrom a single movable contact 22. Outer contact 16 projects radially inwardly and is of extended length so that its inner tip contacts and continuously engages ring 21. Movable contact 22 may be turned to contact either contact 17 or 18 at will, or may be turned in such position as to contact neither of said contacts 17 or 18.

A central shaft 23 is keyed to inner ring 19. As is well understood in this art, a knob (not shown) may be used to turn shaft 23 and thus to turn inner ring 19 and cause contact 22 selectively to engage either of the contacts 17 or 18, or neither of said contacts.

On the upper deck 13 of switch 11, there is provided an outer ring 26 of dielectric material, having spaced around its periphery five stationary contacts 27, 28, 29, 30, 31, contact 27 being of extended radial length. Centrally disposed inside outer ring 26 is inner ring 32, likewise formed of dielectric material and having around its periphery an annular conductor ring 33 from which radially projects a single movable contact 34. Inner ring 32 is likewise keyed to shaft 23, and thus the movable contacts 34 and 22 turn together and are disposed directly above each other. Contact 27 continuously engages ring 33 and is disposed immediately above contact 16. Contacts 28 and 29 are disposed serially adjacent contact 27, and are directly above contacts 17 and 18. Additionally, two other contacts 30 and 31 are positioned adjacent contact 29. A jumper wire 36 electrically connects contacts 29 and 30 together.

As has been indicated, various types of electrical components may be controlled by the switch 11 and circuit hereinafter described. For purpose of illustration, there is provided an amplifier 41 optionally controlled by a manual switch 42 which amplifier may be used to amplify the output of a tuner 43, a record player 44, a tape transport 46, or some entirely independent source of radiant energy. A second component is a record player 44 driven by an electric motor 47. Such a record player 44 ordinarily has incorporated therein an automatic switch 48 which is closed only whenever there is one record being played or in the record player magazine. Switch 48 is opened when the supply of records is exhausted. The construction and operation of switch 48 is well understood in this art and subject to considerable variation. There is further provided a manual spring-loaded starter switch 45 which shunts switch 48 and is only instantaneously closed.

Another component is a tuner 43, such as a radio tuner, and tuner 43 is likewise optionally controlled by a manual switch 51.

Still another component is a tape transport 46 driven by a second motor 52. Transport 46 is controlled by a manual switch 53, and also has incorporated therein an automatic switch 54 similar in function to switch 48 and also well understood in the art, which turns off motor 52 when the supply of tape in the transport is exhausted. It will be understood that instead of a tape transport 46, a tape recorder may be employed.

As is apparent from the wiring diagram, transport 46 can be turned on or off by switch 53 regardless of the setting of switch 11. The apparatus can be used to record off the phonograph, radio or an external source.

As has been set forth, the use and variety of components is subject to considerable modification, and that the components heretofore illustrated and described are merely representative.

A source of alternating current having input wires 61 and 62 is provided. Wire 61 is connected through branch 63 to contact 16 and thus continuously energizes ring 21 of the lower deck 12 of the switch 11. Wire 61 is also connected by branch wire 64 to one side of the amplifier 41, and by branch wire 66 to one side of motor 52 of tape transport 46. The other input wire 62 is connected by branch 67 to contact 29 and, by reason of shorting wire 36, likewise to contact 30. Branch wire 68 connects lead wire 62 to one side of automatic switch 48 of record player 44. Wire 77 connects the opposite side of switch 48 to lead wire 78 which extends from contact 23 to one side of motor 47. Wire 79 connects motor 47 to contact 17. Manually-operated, spring-loaded switch 45 is installed in wire 75 which shunts switch 48 and serves to start motor 47 when desired. Branch wire 69 also connects lead wire 62 to one side of tuner 43. The opposite side of tuner 43 is connected by wire 71 to one side of optional manual switch 51, the opposite side of which is connected by wire 72 to contact 18. Wire 81 extends from contact 30 to one side of manual switch 53, the opposite side of which is connected by wire 82 to automatic switch 54 of tape transport 46, switch 54 being connected by wire 83 to lead wire 84 which extends from contact 31 to motor 52.

Wire 86 extends from sliding contact 27 to one side of manual switch 42 of amplifier 41, and the opposite side of optional manual switch 42 is connected by wire 87 to amplifier 41.

There are five positions of switch 11, as marked by representative indicia on a dial around the periphery of switch 11, and arrow 91 is movable with shaft 23 to designate the proper dial marking. In the "off"-position, movable contacts 22 and 34 engage contacts 16 and 27, respectively, and, hence, switch 11 is inoperative and all components are deenergized.

In the "phono"-position, the record player 44 is energized, contact 22 engaging contact 17 and contact 34 engaging contact 28. As will appear from the circuitry illustrated, motor 47 is energized when switches 48 and 45 are closed. Amplifier 41 is turned on and off automatically by the record player switch 48 and is further controlled by its own manual switch 42. "Phono" is the only position in which motor 47 is energized.

In the third, or "radio"-position, the amplifier 41 and tuner 43 are both energized when manual switches 42 and 51 are closed. The tuner 43 is not energized in any other position of the switch 11.

In the "amplifier"-position (the position of the parts in the accompanying wiring diagram) the amplifier 41 only is energized and may then be used with other inputs, tape recorders and the like, as is well understood in this art.

In the fifth, or "tape"-position, the tape transport 46 can be turned on or off at any time by its manual switch 53, and the amplifier 41 is then energized. The amplifier may be deenergized automatically in this position when the supply of tape in the transport is exhausted and switch 54 opened.

Examination of the circuit shown in the accompanying drawing shows that when switch 11 is turned to "amp" position, amplifier 41 is energized but motor 47 cannot be energized regardless of the setting of switch 48. In the "phono" position of switch 11 the amplifier 41 and the motor 47 are turned off and on by switch 48. The foregoing arrangement of components has utility apart from the other features of the invention.

I claim:

An electrical system comprising a first rotary switch having a first rotary contact, a first and a second stationary contact arranged on said first rotary switch to be selectively individually engaged by said first rotary contact; a second rotary switch having a second rotary contact, third, fourth, fifth, and sixth stationary contacts arranged on said second rotary switch to be selectively individually engaged by said second rotary contact; means for mechanically connecting together said first and second rotary contacts for simultaneous movement; an amplifier having a first amplifier power input and a first amplifier power output; a first and a second power lead adapted to be connected across a source of electrical energy; said first amplifier power input being connected to said second power lead and said first amplifier power output being connected to said second rotary contact; a first device for playing back a first form of prerecorded intelligence, said first device including a first drive motor having a second motor input and a second motor output, a first normally closed switch having one side connected to said second power lead and to said fourth and fifth stationary contacts and the other side connected to said second motor input and to said sixth stationary contact, the second motor output being connected to said second stationary contact; an intelligence receiving means having a third power input and a third power output, said third power input being connected to said first power lead and said third power output being connected to said first stationary contact; a second device for playing back a second form of prerecorded intelligence, said second device including a second drive motor having a fourth motor input and a fourth motor output, and a second normally closed switch having one side connected to said fourth stationary contact and the other side connected to said fourth motor input and to said third stationary contact, said fourth motor output being connected to said second input lead; said first rotary contact being connected to said second input lead, whereby said amplifier is maintained in energized condition on any position of said first and second rotary contacts so long as said normally closed switches are closed.

References Cited in the file of this patent

UNITED STATES PATENTS

| | | |
|---|---|---|
| 2,534,930 | Simmons | Dec. 19, 1950 |
| 2,557,245 | Zillger | June 19, 1951 |
| 2,843,677 | Rush | July 15, 1958 |